June 8, 1954 K. L. SCHAUS 2,680,375
FLOW EQUALIZER FOR DIAPHRAGM TYPE GAS METERS
Filed May 29, 1950
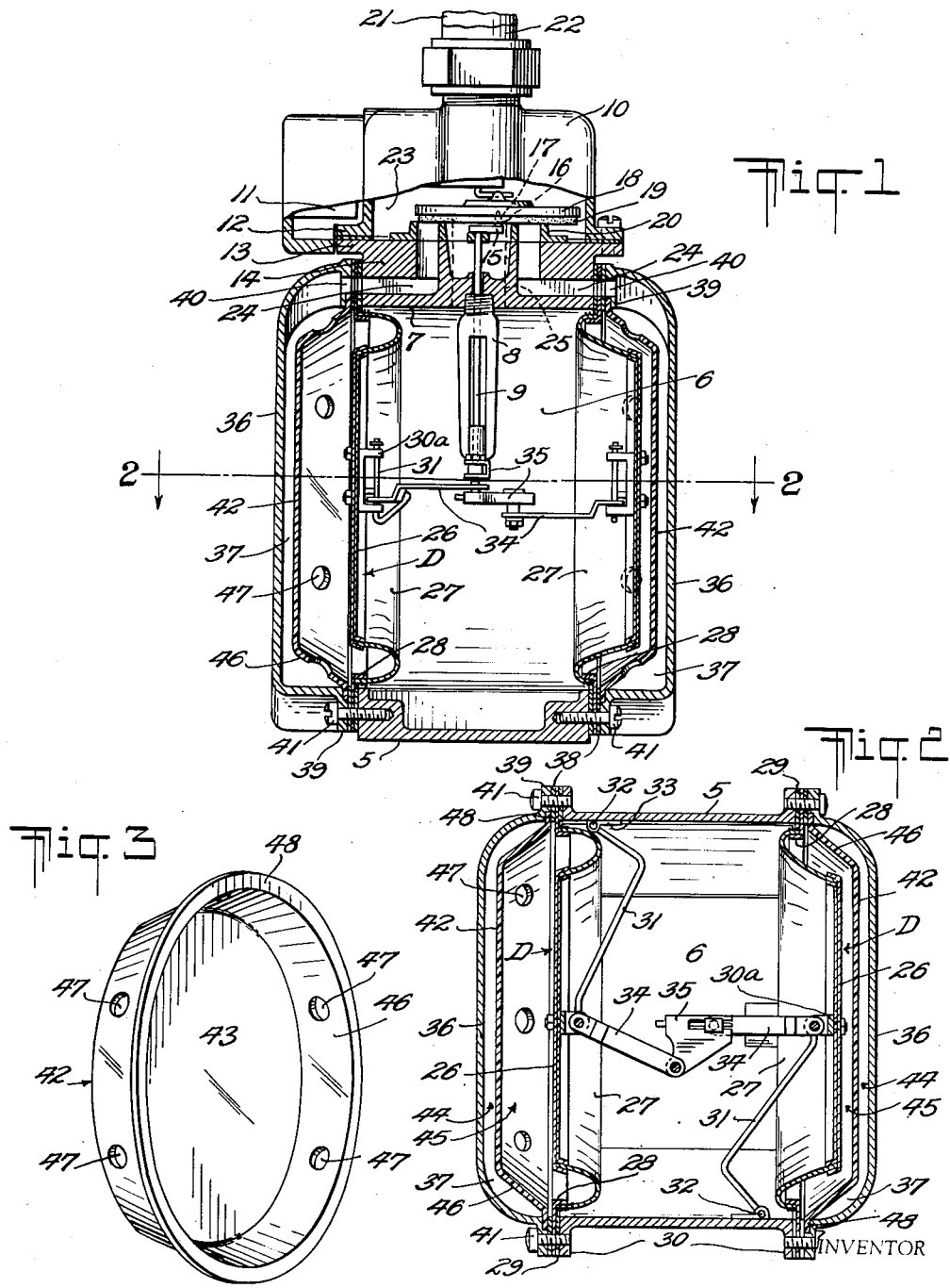
INVENTOR
Karl L. Schaus
BY W. S. McDowell
ATTORNEY Patented June 8, 1954

2,680,375

UNITED STATES PATENT OFFICE 2,680,375

FLOW EQUALIZER FOR DIAPHRAGM TYPE GAS METERS

Karl L. Schaus, Tempe, Ariz.

Application May 29, 1950, Serial No. 164,891

5 Claims. (Cl. 73—266)

This invention relates to gas meters, having particular reference to apparatus for recording volumetric gas flow wherein are utilized pulsating diaphragms responsive to the gas flow in the actuation of the meters.

In many of such meters gas under main pressure enters the gas inlet of such a meter and travels through valve controlled passages which extend to gas-displacement and measuring chambers located on the outer sides of a pair of relatively spaced flexible pulsating-type diphragms and between such diaphragms. In such meters, the pressure of the gas successively admitted into and expelled from the measuring chambers causes the diaphragms to move longitudinally. Positioned midway between the diaphragms is a meter shaft, which is rotated by crank connections with the pulsating diaphragms, the shaft being employed upon its rotation to operate the gas flow controlling valve mechanism and also for operating an associated counter mechanism.

In these meters the valve mechanism is so actuated as to remain open for a predetermined period of time, permitting of the flow of gas from the inlet of the meter through a passage leading to one or the other of a pair of measuring chambers disposed on the outer sides of the diaphragms, thereby applying pressure to one side of a diaphragm defining a measuring chamber into which gas is admitted, producing pulsation of the diaphragm to turn the meter shaft. The turning of the meter shaft operates the valve mechanism to cut off gas flow from the inlet to the outer measuring chambers and to open passages provided in the meter body, whereby to cause gas to be displaced from the outer metering chambers and travel through said last-named passages to the meter shaft or inner gas-measuring and displacing chamber, in which the gases are present under a somewhat lower pressure than in the outer measuring chambers, the differential in the pressure of the gases being measured on opposite sides of the diaphragms enabling the latter to pulsate. The inner measuring chamber provided between the diaphragms communicates with the gas outlet of the meter through the operation of the shaft actuated valve mechanism.

In diaphragm actuated gas meters of the conventional type described above, a single passage or port is usually provided in the meter body for conducting gas undergoing measurement to each of the outer measuring chambers of the meter, and the same port or passage is also used for conducting gas undergoing expulsion from each of said outer measuring chambers for transmission by diaphragm action to the inner chamber arranged between the diaphragms. The diaphragms each comprise a centrally disposed relatively inflexible disk-like body joined axially by connecting rods with crank elements on the meter shaft. To this inner disk-like body there is attached a flexible body of leather or the like, the other portion of said flexible body being secured to a flat metallic ring which is clamped between one of the removable cover plates of the meter and an annular face provided on the meter body, clamping screws or bolts passing through openings in the cover plate for threadedly uniting the latter and the outer ring of the diaphragm in secure stationary relationship with the meter body.

With this conventional construction, a localized and channeled flow of gas is believed to exist when gas enters either of the outer measuring chambers formed between the diaphragms and said cover plates and, also, when gas is expelled from such chambers by the pulsating action of the diaphragms. This localized or channeled flow of the gas results in an uneven or irregular flexure on the part of the flexible webs or bodies of the diaphragms, causing quite often undesired creasing or wrinkling of the leather of which such diaphragm webs or bodies are composed, so that the effective gas-displacing area of the diaphragm is altered sufficiently to produce error, often of important magnitude, in the measurement indications of the meter registering or recording mechanism.

Accordingly, it is an object of the present invention to provide in the outer gas-displacing and measuring chambers of such meters rigid walled partitions which are disposed between the diaphragms and the removable cover members of the meter and which divisional walls are of pan-shaped cross-sectional configuration with the outer peripheries thereof formed with spaced openings whereby gas while flowing into or upon being expelled from said outer measuring chambers by the pulsating action of said diaphragms will be distributed in a plurality of flow streams disposed circumferentially of the pan-shaped divisional walls, whereby to overcome channeling of gases entering or leaving said outer measuring chambers and to provide a more uniform distribution of such gases over the flexible webs of the diaphragms, so that upon pulsation of the later under working conditions, the webs will roll and flex evenly completely around the diaphragm, avoiding undue creasing or wrinkling of said webs and consequent error or alteration from normal in the flow-recording rates of the meter.

Another object of my invention is to equalize measuring chamber displacement in a gas meter so that an exact amount of gas is measured with each stroke of the diaphragms.

A further object is to maintain such equalized measuring chamber displacement in meter operation over a prolonged period of time.

It is a well established fact that very few of the diaphragms presently used in gas meters will maintain throughout their entire period of use a precise gas-displacement action in producing high accuracy in the gas flow counter or recording mechanisms of such meters. This is especially true with metallic case meters employed in intermediate or high pressure gas-distributing systems, particularly when such meters are disposed in outside locations where they are subjected to extreme variations in weather conditions.

In general, gas meter accuracy is considered to be acceptable when it records within two per cent., either fast or slow, of a predetermined norm when tested on the meters rated capacity and when handling 35 to 40 cu. ft. per hour.

It is, therefore, a further object of the invention to provide a meter which, after a prolonged period of use, will maintain its accuracy in the recording of gas flow within very close limits, that is, not in excess of one-half of one per cent., plus or minus, of its rated capacity.

Error in such meters is largely attributable to the deterioration of the flexible diaphragms. Drying out and shrinking of the diaphragm leather is known to cause meters to operate too rapidly, producing what is known as "fast" meters. Under certain conditions, the leather in such diaphragms will stretch, causing retardations in the operation of the meter and producing what is known as a "slow" meter. Another reason for inaccurate meters is the setting or forming of creases or wrinkles in the diaphragm leather after the diaphragm has been in service for a period of time. This condition has somewhat the same effect as dry diaphragms, because the creases reduce the diaphragm's total displacement area and cause a "fast" meter. In one way or the other, the amount of gas displaced from the measuring chamber is either decreased or increased per stroke of the diaphragm with respect to normal.

The ported divisional walls of the present invention, when disposed in the outer measuring chambers of a meter, serve to distribute and equalize the gas pressures on the flexible webs of the diaphragms, maintaining the form of such webs and allowing them to flex and roll uniformly in response to the pulsating action of the diaphragm, the action resulting in a longer life of the diaphragms as well as a high degree of accuracy on the part of the meter equipped with the present invention in recording gas flow.

With these and other objects and advantages of the invention in view, reference is to be had to the following description and the accompanying drawings, wherein:

Fig. 1 is a vertical sectional view taken through a gas meter having the diaphragm and distributor structure forming the present invention;

Fig. 2 is an enlarged horizontal sectional view taken on the line 2—2 of Fig. 1;

Fig. 3 is a perspective view of the ported distributor and gas flow equalizer forming the present invention.

In the accompanying drawings, there has been illustrated a conventional type of gas flow recording meter, the same having been selected for illustration since it permits of the use of the gas flow distributing means forming the present invention with marked advantage. However, it will be understood that I reserve the right to employ my invention not only in connection with the gas meter illustrated but also other types of gas meters wherein is utilized pulsating diaphragms having flexible webs.

In this instance, the meter comprises a casing having a box-like main section 5 preferably formed to include rigid cast metal walls. The section 5 is formed to include an internal cylindrical chamber 6. Extending into this chamber from the arcuate top wall 7 thereof is a bearing bracket 8 in which is supported for rotation a vertically extending meter shaft 9. This shaft extends upwardly and terminates above the top wall 7 within the confines of a detachable head 10, which carries a conventional counter mechanism 11. The lower part of the head 10 is formed, as usual, with a laterally directed attaching flange 12 which is adapted to be seated on a gasket carried by a corresponding flange 13 formed on the upper part of a boxing 14 which constitutes an integral part of the casing section 5.

The upper end of the shaft 9 carries a crank 15, the outer end of which being formed with a stud 16 which is receivable in a vertical socket 17 formed axially in an oscillatory valve disk 18, the latter carrying a ground glass ring 19 which rides on the upper edges of a spider 20 stationarily mounted on the top wall structure 7 of the section 5.

The head 10 is provided on one side with a vertical gas inlet extension 21 which opens to the hollow chamber-forming interior of said head. At its opposite end, the head 10 includes a gas outlet passage 22 which, through the walls of the passage is maintained out of communication with the interior chamber of the head.

Gas entering the meter under known pressure travels through the inlet extension 21 which is connected with an associated main, not shown, and enters the internal chamber 23 of said head. As the diaphragms (later described) of the meter pulsate and rotate the meter shaft 9, eccentric rotary motion is imparted to the valve disk 18 by the shaft-carried crank 15. This rotation of the disk is such that a port of the spider 20 is uncovered sufficiently by the disk to allow gas flow under main pressure from the chamber 23 of the head 10 through the spider and thence into one or the other of a pair of gas inlet passages 24 which are cored in the top wall structure 7 of the meter casing. Similarly, as the disk 18 rotates in its orbit produced by the stud 16 on the outer end of the crank 15, another ported region of the spider will be uncovered by the valve disk while the first-described ported region remains covered by said disk and out of communication with the chamber 23, so that gas will flow first through one of said inlet passages 24 and then later through the other. The gas outlet passage 22 in the head 10 communicates at its lower end with a port 25 which constantly is in open communication with the internal chamber 6 of the meter. In exhausting gas from the passages 24, the under surface of the disk 18 is provided with the usual recesses which, in the rotation of the disk valve 18, provide for communication between the passages 24 and the exhaust port 25, the latter leading to the internal chamber 6 which is in communication with the exhaust connection 22. All of this construction is, of course, conventional in diaphragm meters of the type under consideration.

Meters of the type under consideration employ to operate the shaft 9 and its associated mechanisms a pair of longitudinally spaced vertically disposed diaphragms D of the pulsating type. Each of these diaphragms consists preferably of a disk-like body 26 composed of a pair of interfitting disk sections of sheet metal or other relatively inflexible material. The outer portions of the disk-like bodies 26 are flanged and have firmly secured thereto the inner edge regions of leather or other flexible and annular webs 27. The outer edge of each these webs is rigidly and similarly fastened, as by the use of tying cord, to a flange formed on the inner circular edge of an outer mounting ring 28 which also may be of metal. The inner face of each of the disks 28 is adapted to be seated on a gasket 29 which is carried by the outer flat faces of circular flanges 30 which are integrally formed with the opposite ends of the section 5 of the meter. As differential pressures are applied to the opposite faces of these diaphragms, the disk-like bodies 26 thereof pulsate or reciprocate in the longitudinal axis of the meter. The bodies 26 are of smaller diameter than the internal diameter of the mounting rings 28. This enables the leather webs 27 to flex and roll with the back and forth movement of the disk bodies 26.

Each of these bodies carries on its inner face a bracket 30a to which is pivotally secured the inner end of an angularly bent supporting arm 31, the outer end of said arm being pivotally mounted as at 32 in connection with brackets 33 stationarily mounted on the inner wall of the chamber 6. By the arms 31, the inner movable sections of the diaphragms are supported for back and forth movement. Such movement is translated into rotary movement on the part of the meter shaft 9 by means of links 34 which have their outer ends pivoted to the brackets 30a and their inner ends pivotally joined with a crank structure 35 fixed to and rotatable with the lower end of the meter shaft 9.

Cover plates 36 are applied to the ends of the meter. Each of these cover plates may be of cast metal and possesses in transverse cross section a dish-like configuration. The dished body of each of these cover plates in cooperation with the outer surface of each of the diaphragms produces an outer gas-measuring and displacing chamber 37. Gas is introduced into these chambers from the head 10 and its chamber 23 by way of the inlet passages 24 present in the top wall structure 7 of the casing section 5. The passages 24 communicate at their outer ends with slots formed in the gasket 29 and in the mounting ring 28 of each diaphragm. A similar slot is formed in each of pair of gaskets 38 which are interposed between the flat outer faces of the mounting rings 28 of said diaphragms and the inner faces of vertically disposed annular flanges 39 integrally formed with each of the cover plates 36. In each of the flanges 39, a gas slot 40 is provide communicating with the other slots arranged in the top of the casing 5 and associated parts. Headed screws 41 detachably unite the cover plates 36 with the body section 5 of the meter casing. By these bolts, the cover plates are united with the body section and also the gaskets shown at 29 and 38 and the mounting rings 28 of the diaphragms.

The mechanism so far described in detail is that of a conventional gas-flow-recording meter. The present invention resides in mounting a divisional wall 42 of relatively rigid construction between the outer face of each of the diaphragms D and the inner face of each of its associated cover plates 36. Each divisional wall in its preferred form comprises a pan-like body of sheet metal having a disk-like wall 43 which is spaced from the inner surface of the cover plate to produce an outer compartment 44 in each of the chambers 37 on one side of the divisional wall and an inner compartment 45 on its other side. The wall 43 terminates in a frusto-conical flange 46, which is formed with a plurality of circumferentially spaced openings 47 substantially equally spaced around the periphery of each of the divisional wall or distributor members 42, the openings 47 establishing gas flow communication between the compartments 44 and 45. The flange 46 terminates in a vertical annular flange 48 which is adapted to be positioned immediately adjacent to and clamped between the cover plate flanges 39 and the diaphragm rings 28.

With the divisional members 42 in position, it will be seen that pulsation of the diaphragms associated therewith cause gas to be drawn into the inner compartments 45 or expelled therefrom by passage through the openings 47 or their equivalents. Without the use of these divisional wall members, gas is drawn into or expelled from the outer chambers 37 directly from or through the passages 24 under channel flow conditions. There is no equalized distribution under these conditions of the gas in all portions of the chambers 37 exposed to the flexible webs of the diaphragms. As previously stated, this results in an uneven or irregular action on the part of the diaphragm webs when the same are being flexed by diaphragm pulsation, producing creases or wrinkles in the leather webs which affect detrimentally the normal gas-displacing capacity of said diaphragms. With the use of the ported partition devices shown at 42 in the drawings, such unequalized distribution of the gases in the outer measuring chambers is avoided, with the result that the webs flex normally over their full surface area and their efficient operating life is greatly extended.

The ports or openings 47 through which the gas is displaced from each of the pans 42 are equally spaced around the sloping frusto-conical flange 46 of said pans. This arrangement of the ports or openings permits equalized flow distribution of the gas from the pan into the cover plate compartment 44 which is in communication with the channel passages 24 of the meter.

My invention further provides a certain amount of temperature control of the gas coming into direct contact with the leather webs of the diaphragms. This is due to the insulating space between the metallic cover plates of the meter and the equalizer pans 42. This construction is particularly effective when the meter is located in operating positions where the sun strikes it part of the time. An important function accomplished by the use of the equalizer devices 42 is that the diaphragm leather immediately takes a definite form or shape when installed in a meter and maintains that same form on each and every stroke of the meter shaft crank. The baffle members 42 may be formed from synthetic resins, if desired, of a type offering high resistance to the conduction of heat.

While I have shown and described what I con-

I claim:

1. In a gas meter, a casing having a body, a removable cover plate, a diaphragm mounted in said casing, said diaphragm having its peripheral edge clamped between said body and cover plate, passage means formed in said body for admitting gas into and leading the same from a measuring chamber formed in the casing between said diaphragm and cover plate, a relatively rigid and stationarily disposed pan-shaped baffle member positioned in said measuring chamber and dividing the latter into inner and outer compartments, said member including a flat imperforate vertically disposed body panel which terminates circumferentially in an angularly extending flange, the latter being formed with circumferentially spaced openings constituting the sole means for the passage of gas from one of said compartments into the other, the depth of said inner compartment as produced by said flange being such as to maintain the baffle member in spaced relationship from said diaphragm when the latter is advanced to an extreme position in its outward direction of pulsating travel.

2. Gas meter construction as set forth in claim 1, and wherein the angularly extending flange of the baffle member terminates in a securing extension adapted to be clamped with the peripheral portion of said diaphragm between the body and cover plate of said casing.

3. Gas meter construction as defined in claim 1, and wherein said baffle member is composed of a material offering high conductive resistance to the passage of heat therethrough.

4. In a gas meter, a casing having a body and a removable cover plate, a pulsating diaphragm mounted in said casing, said diaphragm having its peripheral edge clamped between said body and cover plate, the body and cover plate being formed with passage means providing for gas flow into and out of a gas-measuring chamber formed in the casing between the diaphragm and cover plate, a relatively rigid stationarily disposed baffle member arranged in and separating said measuring chamber into inner and outer compartments, said baffle member including a flat imperforate body arranged in parallel relation with said diaphragm and cover plate but in spaced relation thereto in all positions of operation of the diaphragm, the body of said baffle member terminating peripherally in an angularly disposed flange adapted to be clamped between said cover plate and casing body, and said baffle member being provided in the flange thereof with circumferentially spaced opening means constituting the sole channels for the passage of gas between the inner and outer compartments of said measuring chamber in the flow of gas through said passage means in response to the pulsation of said diaphragm.

5. In a gas meter, hollow casing means, relatively spaced pulsating diaphragms positioned in and defining with said casing means a pair of outer measuring chambers, each of said diaphragms comprising an outer ring, an inner rigid disk section, and a web of flexible material uniting the outer ring with said inner disk section in a manner permitting of pulsating movement of the inner section, a gas flow distributing member positioned in each of said outer chambers and dividing the latter centrally into inner and outer compartments, and gas-admitting and discharging passage means formed in said casing means in open communication with the outer compartment of each of said outer gas-measuring chambers, said distributing member comprising a substantially pan-shaped body having an imperforate central region terminating outwardly in a frusto-conical flange, said flange being formed with circumferentially spaced openings constituting the sole means of communication between the inner and outer compartments of said outer gas-measuring chambers.

References Cited in the file of this patent

UNITED STATES PATENTS

| Number | Name | Date |
|---|---|---|
| 132,496 | Spooner | Oct. 22, 1872 |
| 213,680 | Mounteney | Mar. 25, 1879 |
| 287,587 | Spooner | Oct. 30, 1883 |
| 563,438 | Bel | July 7, 1896 |
| 930,435 | Sutherland | Aug. 10, 1909 |
| 1,469,645 | Kobbe | Oct. 2, 1923 |
| 1,788,754 | Waddell | Jan. 13, 1931 |
| 1,901,837 | Bateholts | Mar. 14, 1933 |
| 2,094,257 | Luck et al. | Sept. 28, 1937 |
| 2,522,703 | Collins | Sept. 19, 1950 |

FOREIGN PATENTS

| Number | Country | Date |
|---|---|---|
| 49,645 | Denmark | Dec. 10, 1934 |